Figure 7:
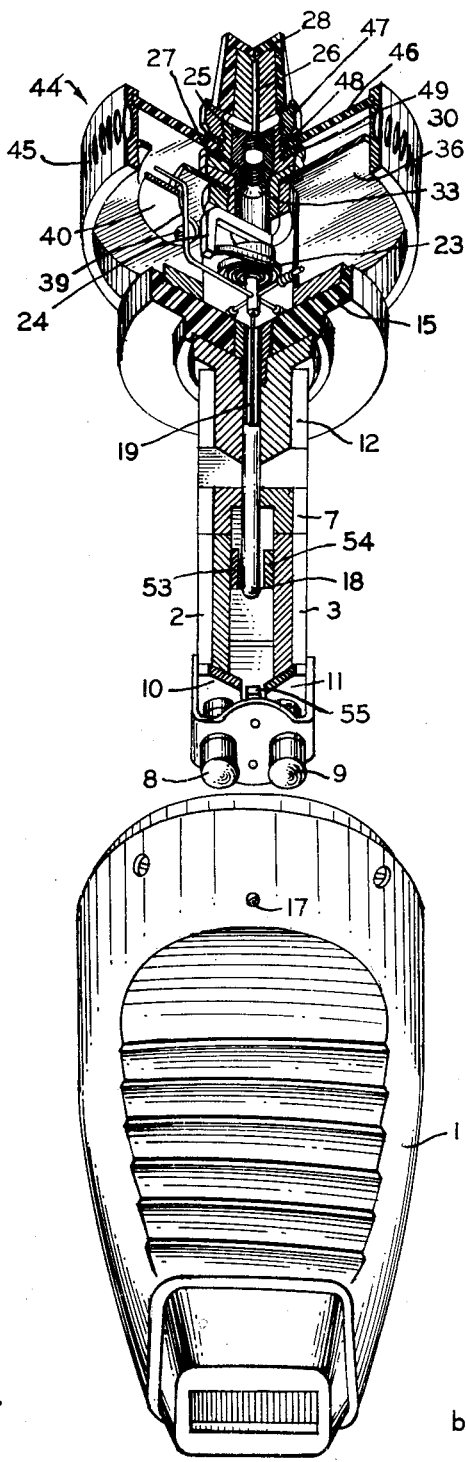

Sept. 8, 1959   J. H. WRIGHT ET AL   2,903,645
MAGNETIC THICKNESS GAUGE
Filed Sept. 28, 1954   3 Sheets-Sheet 1
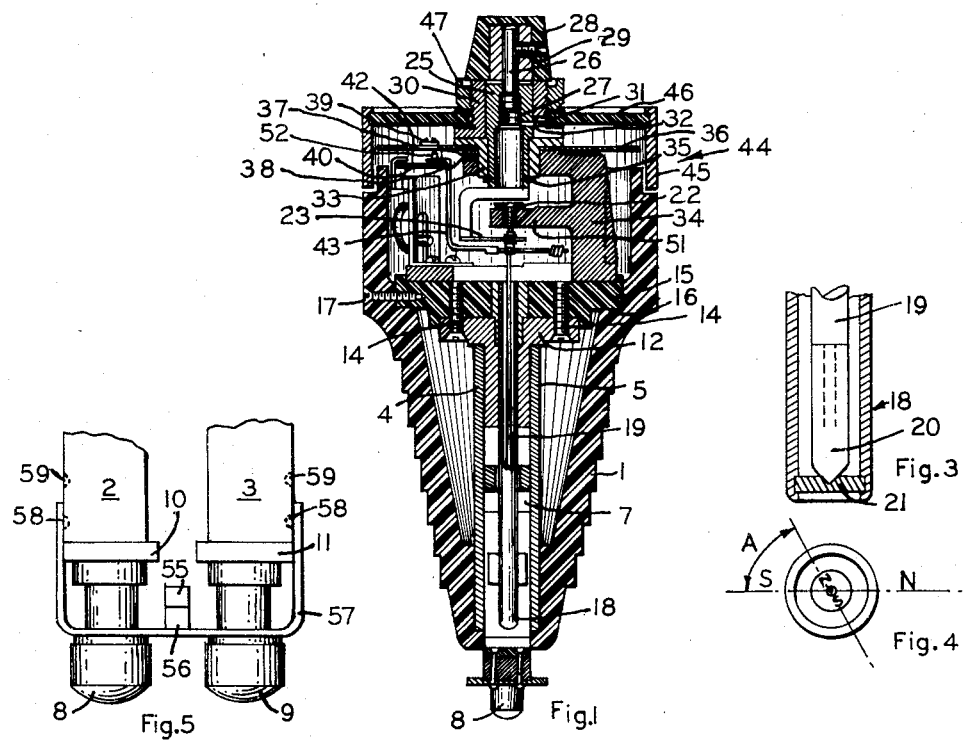
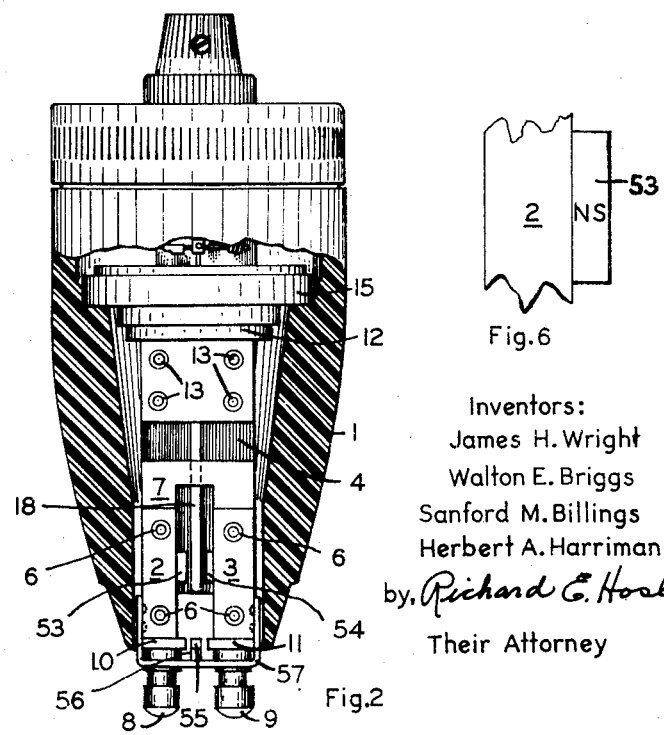
Inventors:
James H. Wright
Walton E. Briggs
Sanford M. Billings
Herbert A. Harriman
by, Richard E. Hooley
Their Attorney Sept. 8, 1959   J. H. WRIGHT ET AL   2,903,645
MAGNETIC THICKNESS GAUGE
Filed Sept. 28, 1954   3 Sheets-Sheet 3

Inventors:
James H. Wright
Walton E. Briggs
Sanford M. Billings
Herbert A. Harriman
by. *Richard E. Hosley*
Their Attorney United States Patent Office 2,903,645
Patented Sept. 8, 1959

2,903,645

MAGNETIC THICKNESS GAUGE

James H. Wright, Lynnfield, Walton E. Briggs and Sanford M. Billings, Lynnfield Center, and Herbert A. Harriman, Nahant, Mass., assignors to General Electric Company, a corporation of New York Application September 28, 1954, Serial No. 458,782

13 Claims. (Cl. 324—34)

This invention relates to thickness gauges and has particular application to gauges for determining the thickness of layers or coatings of non-magnetic material on magnetic base metals.

As is well known, it has been a common practice to apply various types of non-magnetic coatings or films to magnetic base metals. Such coatings are applied in some cases for protective reasons such as, for instance, to protect the surface of the base metal from corrosion or rust or to shield the base metal from the erosive effects of high temperature, high velocity gases. Coatings of this type are also employed for various other purposes such as to provide electrical or thermal insulation or to prevent possible contamination of foods or liquids intended for human consumption, which contamination might otherwise occur from contact with the base metal. Various types of ceramic and plastic materials have found considerable application along the above-mentioned lines.

The widespread utilization of non-magnetic coatings and films on magnetic base materials has created an increasing need for reliable and versatile instruments and gauges for accurately measuring and determining the thickness of such coatings. The need for instruments of this type is also increasing in related applications wherein thicknesses of non-magnetic layers are to be measured or inspected, such as in the case of measuring the thickness of paper or other non-magnetic material placed on a magnetic base metal to allow a thickness reading to be taken.

It will be appreciated that, in order to satisfy this need, a gauge of this type must be adaptable to a wide variety of applications and inspection techniques since, in some cases, it will be desired only to determine whether the non-magnetic layer or coating falls within certain specified tolerance limits without reference to what the actual coating thickness may be while, in other cases, the actual thickness of the non-magnetic layer or coating is to be determined. Further, the thickness of the layer to be measured will vary considerably with different applications, a consideration which gives rise to a corresponding need for an instrument which will permit thickness measurements and thickness tolerance inspections with a high degree of accuracy over a wide range of thickness measurements and determinations. It will also be recognized that, in order to be adaptable to the normal day to day inspection techniques and procedures that are commonly employed, such a gauge must also be rugged in construction and simple to operate.

In general, gauges and instruments for measuring thicknesses of non-magnetic layers or films on magnetic materials operate on a magnetic shunting principle. That is, a magnetic field of a predetermined reference intensity is set up in an air gap portion of a magnetic circuit and suitable test probes are provided and positioned such that when the probes are brought into contact with the surface of a material to be tested, the material being tested is placed in magnetic shunting relationship with the air gap. Since the degree of proximity of the magnetic base material to the test probes, which is determined by the thickness of the non-magnetic coating to be measured, controls the net shunting effect on the air gap, it can be seen that the intensity of the air gap field is a function of the thickness of the non-magnetic layer.

It has been a common practice in such instruments to provide a rotatably mounted, spring restrained soft iron rotor in the air gap field with the rotor having a suitable pointer connected thereto to register deflection on a scale calibrated in thickness units. It will be realized that with a magnetic armature mounted for deflection against a torsional restraining spring, the maximum angular deflection which can be provided is, for all practical purposes, something in the neighborhood of 90°, which with the indicating arrangement described above yields a scale having a total sector of around 90° or less.

Another problem which has heretofore existed in instruments of this type arises from the fact that the field in the vicinity of the magnetic rotor is not reduced to zero when the surface engageable probes are brought directly into contact with the surface of a magnetic material. This is by reason of the fact that the shunt path through the material being tested does not form a perfect magnetic short circuit around the air gap in which the magnetic armature is mounted. Consequently there is some torque tending to cause deflection of the instrument indicating means even though the instrument probes are directly in contact with the surface of a magnetic material where the desired thickness reading on the instrument is to be zero.

In the past, the torque at zero thickness has been compensated for by adjustment of the spring means opposing deflection. That is to say, the zero of the instrument is suppressed by adjusting the deflection opposing spring means to balance the torque tending to cause deflection at the point where a zero scale reading is desired. In other types of instruments this proposition is usually quite simple since the deflection torque to be compensated for is normally quite small. In a magnetic thickness gauge of the aforementioned type, however, this adjustment can become a serious problem since the deflection torque to be suppressed is relatively quite large.

It is, accordingly, one object of this invention to provide an improved magnetic thickness gauge which is not subject to the above-discussed disadvantages and problems.

It is another object of this invention to provide an improved indicating arrangement for an instrument of the magnetic deflection type, which arrangement provides for a greatly expanded scale relative to the total available deflection of the magnetic deflection means employed in instruments of this type.

It is a further object of this invention to provide an improved magnetic thickness gauge for measuring thicknesses of non-magnetic coatings or layers on magnetic base materials, which improved gauge has greater utility and is more versatile in application than gauges of the types heretofore employed.

Briefly stated, this invention as embodied in one form thereof in a magnetic thickness gauge of the aforementioned type comprises manually adjustable means for adjusting the magnitude of the spring force opposing deflection of the magnetic armature, thus allowing adjustment of the magnetic armature and its associated indicating means to a preselected position. Second indicating means are provided for indicating a reading on an expanded scale responsive to adjustment of the means for adjusting the spring force, thus providing a useful scale which can be expanded in size far beyond the total available deflection range of the magnetic armature. Manually adjustable means are also provided for identifying preselected deflection limits of the magnetic armature and its associated indicating means, thus allowing the gauge to be used as an inspection instrument to determine whether the thickness of a given non-magnetic coating falls within a desired tolerance range without the necessity for determining the actual thickness of the coating.

Further, the expanded scale is provided with a plurality of scale ranges, and a magnetic shunt is provided which is adjustable to different positions to provide different fixed amounts of magnetic shunting around the air gap in which the magnetic armature is mounted, thereby allowing the sensivity of the instrument to be set by movement of the shunt to correspond with the desired scale range on the expanded scale. This invention also serves to eliminate the zero supression problem discussed above by the provision in one embodiment thereof of magnetic biasing means positioned such that the field produced thereby opposes the main field in the air gap in which the magnetic armature is mounted. The field strength of the magnetic biasing means is such that when the gauge probes are brought directly into contact with the surface of a magnetic material, the net strength of the field in the air gap becomes substantially zero, so that only a minor adjustment of the spring means opposing deflection is necessary to set the zero point of the gauge.

This invention will be better understood, and other objects and advantages will be apparent from the following description taken in connection with the accompanying drawings, and its scope will be pointed out in the appended claims.

Figure 8:
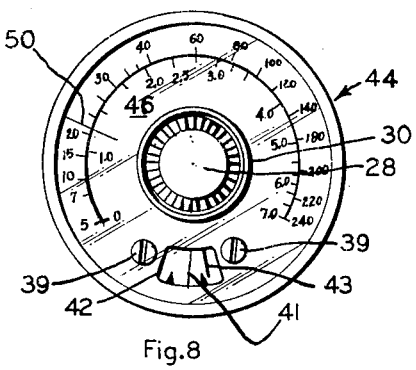
Figure 9:
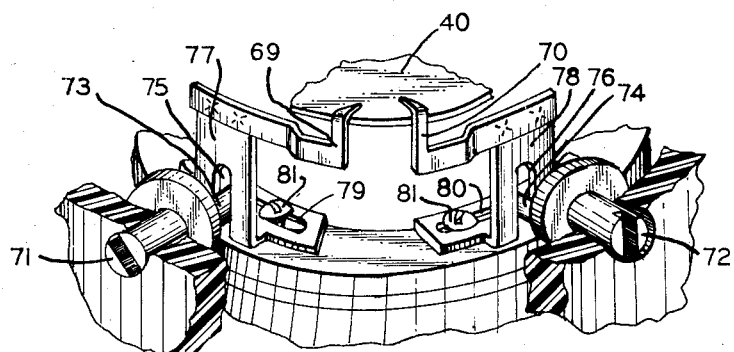
Figure 10:
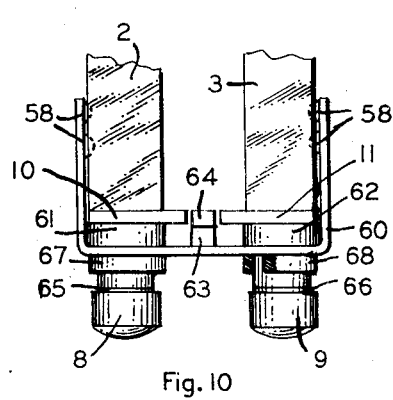

In the drawings, Fig. 1 is a side elevational view in cross section of a magnetic thickness gauge embodying this invention; Fig. 2 is a front view, partly in cross section, of the gauge shown in Fig. 1, taken perpendicular to the view of Fig. 1; Figs. 3 and 4 are fragmentary cross sectional views of the permanent magnet armature arrangement of the gauge illustrated in Figs. 1 and 2; Fig. 5 is an enlarged fragmentary view of the magnetic shunting arrangement shown in Fig. 2; Fig. 6 is an enlarged fragmentary view of a portion of the magnetic circuit shown in Fig. 2, illustrating the polarization of the bias magnets; Fig. 7 is an exploded perspective view, shown partly in cross section, of the gauge of Figs. 1 and 2; Fig. 8 is a plan view illustrating the expanded scale and the null indicating arrangement together with the adjustable pointers for identifying preselected limits of deflection of the magnetic armature and its associated indicating means; Fig. 9 is an enlarged fragmentary perspective view showing the adjustable limit indicating pointers in greater detail; while Fig. 10 illustrates a scale changing magnetic shunt arrangement alternative to that shown in Fig. 5, in which alternative arrangement means are provided for maintaining substantially the same scale zero with the different scale settings.

The gauge illustrated in the drawings and embodying this invention comprises an outer casing 1 preferably formed of a non-magnetic material such as a suitable plastic or non-magnetic metal. The magnetic circuit includes a pair of spaced apart bars 2 and 3 best seen in Fig. 2, formed of a magnetic material such as soft iron. The bars 2 and 3 are attached to a pair of supporting plates 4 and 5 by means of screws which extend through the plates 4 and 5 and into a series of tapped holes 6. The bars 2 and 3 are interconnected by a substantially U-shaped permanent magnet 7 which serves to set up a magnetic field through the bars and in the space between the bars, which magnetic field also holds the magnet 7 in place on the bars 2 and 3. The bars 2 and 3 are terminated at their outer ends in a pair of surface engageable prongs or probes 8 and 9 which, in the arrangement illustrated, are threaded into the bars thereby at the same time securing a pair of soft iron plates 10 and 11 in place, the purpose of which plates is to be hereinafter described.

The two plates 4 and 5, which support the magnetic circuit elements as described above, are in turn attached to a supporting member 12 by means of screws which extend through the plates and into a series of tapped holes 13 in the member 12. The supporting member 12, which is formed of a suitable non-magnetic material such as aluminum, is secured by means of screws 14 to a circular supporting plate 15 which rests on an annular shoulder portion 16 of the casing 1, and which is secured to the casing by means of a screw 17 which extends in from the outer surface of the casing. The plate 15 is also of a non-magnetic material and may be conveniently formed of a suitable moldable plastic material.

Extending through the permanent magnet 7 and into the space between the bars 2 and 3 is a tubular casing 18 which encloses a shaft 19 carrying, secured thereto at its lower end, a permanent magnet or armature 20 as illustrated in the fragmentary view of Fig. 3. The permanent magnet portion 20 of the shaft 19 is pivotally supported in a jewelled bearing 21 at the lower end of the casing 18 as shown in Fig. 3, while the shaft is pivotally supported at its upper end in an adjustable bearing member 22 containing a jewel bearing insert, not shown.

The permanent magnet 20 is magnetized transversely to its pivotal axis as shown in Fig. 4. The significance of the angle A between the magnetic axis of the magnet 20 and the axis of the field between the bars 2 and 3 will be discussed later. Both the casing 18 and the shaft 19 are, of course, formed of a non-magnetic material such as, for instance, brass or aluminum.

A spirally shaped spring 23, whihc can be more clearly seen in Fig. 7, is attached at its inner end to the shaft 19 and at its outer end to an arm 24 which is adjustable in a manner hereinafter described. The arm 24 is attached by brazing or soldering or any other suitable means to a bushing 25 as shown in Figs. 1 and 7. A threaded shaft 26 extends into an internally threaded portion 27 of the bushing 25 and a knob 28 is attached to the shaft 26 by means of a set screw 29. An externally threaded bushing 30 is secured by means of a pin 31 so as to be rotatable with the bushing 25. The pin 31 extends into a slot 32 in the bushing 30 so as to allow for a relative axial movement between the two bushings 25 and 30. The bushing 25 is rotatably mounted in a bearing 33 which is secured against rotative movement in the bracket 34 in any suitable manner such as by means of set screws, not shown.

With the arrangement just described, the knob 28 can be tightened down against the bushing 30 to draw the bushing 25 out so that a snap ring 35 thereon is caused to bind against the bearing 33, thus locking the bushing 25 against rotation for a purpose hereinafter described.

A scale plate 36, bearing suitable indicia calibrated in the desired thickness units is mounted on the bracket 34 directly beneath the flanged portion of the bearing 33 and is secured against rotative movement by means of a tab portion 37 which is bent into a recess 38 in the bracket 34. Attached to the scale plate 36 by means of a pair of screws 39 is a sub-scale plate 40 bearing a null indicating mark 41 visible through an aperture 42 in the scale plate 36 as shown in Fig. 8. A pointer 43 is attached to the pivotally mounted spindle 19 and is positioned to sweep over the area of the sub-scale plate 40 which is visible through the aperture 42.

A cover member 44, which includes a knurled portion 45 and a transparent portion 46 extending over the scale plate 36, is attached so as to be rotatable with the bushings 25 and 30 upon the tightening of an internally threaded annular knob 47 to clamp the transparent portion 46 to the bushing 30 between a pair of washers 48 and 49. Thus with the annular knob 47 tightened as just described and the knob 28 loosened so as to allow rotative movement of the bushing 25, the bushing 25 can be rotated to adjust the force exerted by the spring 23 by grasping the cover member along the knurled portion 45 provided for that purpose and rotating it in either direction. An indicating mark 50 is affixed to the transparent portion 46 of the cover member as shown in Fig. 8 and is positioned to move over the indicia on the scale plate 36 with movement of the cover member. The operation of this arrangement will be described later.

It will be seen that with the magnetic circuit arrangement as hereinbefore described, the permanent magnet 7 sets up a magnetic field running from one leg of the magnet 7 through the soft iron bar 2 across the air gap between the bars to the soft iron bar 3 and then back to the other leg of the magnet 7. With the magnetic axis of the armature 20 positioned at an angle to the axis of the field set up by the magnet 7 between the bars 2 and 3, the shaft 19 and the armature 20 will deflect against the resilient restraining torque of the spring 23 in response to the intensity of the field in the gap between the bars 2 and 3.

When the prongs 8 and 9 are brought into contact with the surface of a non-magnetic layer or coating on a magnetic base metal, the magnetic base metal is placed in magnetic shunting relationship with the air gap between the bars 2 and 3. The magnitude of this shunting effect is determined by the proximity of the magnetic base metal to the prongs, which is in turn determined by the thickness of the non-magnetic layer or coating to be measured. That is, for relatively thin non-magnetic layers the magnet base metal will be closer to the prongs 8 and 9 and hence provide a greater shunting effect than would be the case for thicker layers where the magnetic base metal would be further away from the prongs. Thus the intensity of the magnetic field between the bars is a function of the non-magnetic layer or coating thickness being measured with the field intensity being decreased as the thickness of the coating decreases and increased as the thickness of the coating increases.

It will be realized that with an instrument employing a magnetic deflection scheme falling within the general category as that just described, the maximum deflection available is normally around 90°. In the event that a soft iron rotor is employed, the maximum available deflection will, as is well known, be something less than 90°, whereas if a permanent magnet type rotor is used, as is the case in the embodiment of this invention illustrated and described herein, the 90° deflection may be exceeded by a slight amount but hardly enough to increase the scale range substantially beyond a 90° sector. By employing the arrangement of this invention, however, the useful scale of an instrument or gauge of this type can be greatly expanded beyond the available deflection of the instrument deflecting means and can occupy, for instance, a total sector, if a circular scale is employed, approaching 360°. The operation of the indicating arrangement described above and yielding the aforementioned advantages will now be set forth.

In order to measure the thickness of a non-magnetic coating on a magnetic base material, the gauge is first positioned with the prongs 8 and 9 engaging the surface of a non-magnetic coating or layer the thickness of which is to be measured. The magnetic armature 20 and its associated spindle 19 will angularly deflect against the force of spring 23 and the pointer 43 will assume a position corresponding to the deflection. The adjustable cover 44 is then rotated to move the arm 24 and adjust the force exerted by the spring 23 until the pointer 43 is aligned with the null mark 41 on the sub-scale plate 40. When this adjustment has been made, the thickness of the coating can be read by referring to the registration of the indicating mark 50 with a calibrated scale on the scale plate 36.

It will be observed that the pointer may deflect to either side of the null mark depending upon the position of the cover member 44 at the time in relation to the thickness of the non-magnetic layer being measured. In the embodiment illustrated, clockwise rotation of the cover member 44 is in a direction tending to wind up the spring 23 although, in the particular instrument shown, it will be seen that such an adjustment decreases the spring torque opposing deflection. An arm 51 extends from the bracket 34 and, in addition to providing a support for the bearing member 22, also acts as a stop for the arm 24 to prevent inadvertent rotation of the cover 44 in either direction beyond its normal sweep.

The null position of the magnetic armature 20 may be preselected at any position and the gauge then designed and calibrated accordingly. It will be realized, however, that the null position will preferably be selected to fall within the higher torque range of the 90° deflection sector taking into consideration that an adequate range should be provided on either side of the null position to allow for adjustment of the pointer in either direction.

In the particular embodiment of this invention described herein, the null position has been selected at the point where the angle A, as seen in Fig. 4, between the magnetic axis of the armature 20 and the axis of the magnetic field between the bars 2 and 3 is approximately 60° with suitable stops, such as a pair of posts 52 extending up from the sub-scale plate 40, being provided to limit the maximum deflection to about 20° on either side of the null position. It has been found that this arrangement provides adequate utilization of the deflection torque available while at the same time allows a sufficient range for adjustment without bringing the armature 20 too near the 90° deflection position where it would tend to become unstable.

With instruments of this type which operate on the magnetic shunting principle, it will be seen, as has been previously pointed out, that when the surface engageable prongs 8 and 9 are brought directly into contact with the surface of a magnetic material the intensity of the field between the soft iron bars 2 and 3 and in the vicinity of the magnetic armature 20 is not reduced to zero although it can be seen that a zero reading is desired at this point. This is by reason of the fact that the shunt path between the probes 8 and 9 and through the magnetic material being tested does not provide a perfect magnetic short circuit across the air gap between the bars 2 and 3 and hence, the magnetic armature 20 will develop a torque tending to cause deflection under these conditions. In the past it has been a rather common practice to compensate for this torque by adjusting the spring means opposing deflection of the magnetic armature to exert an equal torque in the opposite direction and thus retain the magnetic armature in the zero position. In the case of an instrument operating on the above-mentioned shunting principle however the torque to be compensated for at the zero setting is relatively quite large since the field strength under these conditions is likely to be in the neighborhood of one third or an even greater proportion of the maximum field strength which is encountered. The disadvantages of having to suppress a spring zero are numerous and lead to problems of mechanical stability and other rather detailed problems such as the fact that the spring may tend to overlap itself in operation and cause binding as a result of such a large adjustment being required.

This invention eliminates the requirement for relatively large adjustments of the deflection opposing spring by the provision of magnetic biasing means, such as a pair of permanent magnets 53 and 54, which produce a magnetic field in opposition to that produced by the magnet 7 in a manner such as illustrated in Fig. 6. The strength of the field produced by the biasing magnets 53 and 54 is such that when the probes 8 and 9 are brought directly into contact with the surface of a magnetic material the net field strength in the vicinity of the magnetic armature 20 is reduced to the vicinity of zero. That is, the strength of the bias magnets 53 and 54 is sufficient to substantially cancel the field produced in the vicinity of the armature 20 by the magnet 7 when the shunting conditions between the probes 8 and 9 are such that the instrument reading is to be zero. Thus in order to zero the instrument, only very slight adjustments need be made in the spring 23 in order to compensate for the normally expected variations in the components from one instrument to the next, such as differences in field strength of the principal magnet or the biasing magnets etc.

It is to be realized that the strength of the magnetic biasing means will be slightly different for theoretically perfect zeroing where a permanent magnet rotor is employed as in the present embodiment of this invention instead of a soft iron rotor. In such a case, the strength of the bias magnets will slightly exceed the strength of the field produced by the magnet 7 when the probes 8 and 9 are brought directly into contact with a soft iron material or some other magnetic material which is to be used as a reference. The amount by which the field strength of the bias magnets exceeds that of the magnet 7 under the aforementioned conditions is sufficient to cancel the torque producing effect of the poles induced in the soft iron legs 2 and 3 by the permanent magnet rotor. Thus, the net effect of the bias magnets is to reduce the torque of the magnetic rotor or armature to zero when the probes are brought into engagement with a magnetic material selected for calibration purposes.

It should be understood, however, that the difference in field strength of the bias magnets mentioned in the preceding paragraph is slight and can be easily compensated for by a very acceptable range of spring adjustments, the principal objective of the bias magnets being to reduce the field produced by the magnet 7 to the general vicinity of zero under the conditions set forth, thereby allowing adjustment of the zero point without excessively large adjustments of the control spring 23.

Shunting means are also provided for changing the intensity level of the magnetic field in the space between the bars 2 and 3 to allow the sensitivity of the instrument to be adjusted to accommodate different scale ranges. In the embodiment of this invention illustrated, a magnetic shunt 55 is provided for this purpose. The shunt 55 is attached to a nonmagnetic base member 56 which is in turn affixed to a bracket 57 as best seen in Fig. 2. The bracket 57 can be manually moved between the position shown in Fig. 2 and the position shown in Fig. 5 and is provided with protrusions 58 which snap into depressions 59 in the soft iron legs 2 and 3 to hold the bracket in one position or the other.

With the bracket in the position illustrated in Fig. 2, a relatively low reluctance shunting path is provided around the air gap between the bars 2 and 3 through the plates 10 and 11 and the shunt 55, thus reducing the reference level of intensity of the field in the vicinity of the magnetic armature 20. Under this condition, the sensitivity of the instrument is reduced from the non-shunted condition so that a greater range of thickness measurements may be accommodated and a correspondingly increased scale range provided. On the other hand, with the bracket 57 moved to the position shown in Fig. 5 the shunting effect is greatly reduced thereby increasing the intensity of the field in the vicinity of the armature 20. With the bracket set in the latter position then, the instrument becomes more sensitive to thickness measurements so that the full scale sweep represents a smaller range of thickness indications. Although only two positions of the bracket 57 are illustrated, it will be obvious that additional positions may be provided if desired in order to obtain any desired number of scale ranges and sensitivity settings.

In the embodiment of this invention set forth herein, the two scale ranges corresponding to the two shunt positions illustrated are shown in Fig. 8, with the higher scale extending from 1 to 60 mils and corresponding to the shunt position illustrated in Fig. 2.

It will be observed that with the arrangement just described, the two scales do not have the same zero point. This is due to the fact that the field intensity in the vicinity of the armature 20 is less for a zero thickness film being measured when the instrument is set to the higher scale range than when set to the lower scale range. The bias magnets 53 and 54 can on the other hand be chosen to compensate for only one field strength in order to provide a zero torque for zero film thickness as previously set forth. It has been found preferable in this case to choose the bias magnets 53 and 54 with a strength sufficient to provide zero deflection torque at zero film thickness for the lower scale range since thickness measurements in the range approaching zero will normally be made on their lower scale setting. The net result is that the very low range portion of the upper scale can not be included. Normally this is of no particular disadvantage since, as pointed out above, measurements in this low range area would normally be taken on a lower range scale.

However, in the event that it is desired to provide the same zero point on both scales, an alternative shunt arrangement, such as that shown in Fig. 10, may be provided. This arrangement comprises a bracket 60 including a pair of tubular stops 61 and 62 and a shunt support 63 all formed of a non-magnetic material such as brass or aluminum. A magnetic shunt member 64 is attached to the shunt support 63 and the entire assembly is movable between two positions in the same manner as with the arrangement previously described. In order to bring the zero of the upper scale into coincidence with the zero on the lower scale, thin layers of non-magnetic material 65 and 66 are placed in series with the magnetic circuit through the prongs 8 and 9 so as to provide a magnetic reluctance equivalent to the thickness of a non-magnetic coating, which if being measured on the upper scale range setting, would yield a reading coincident with the zero on the lower scale range. Thus, the effect of the non-magnetic spacers 65 and 66 is to shift the zero of the upper scale range to correspond with that of the lower scale range. Then when the shunt and bracket assembly is moved to the lower position corresponding to the lower scale range, the spacers 65 and 66 are shunted out of the circuit by a pair of rings 67 and 68 which are positioned to magnetically bypass the spacers 65 and 66 when the shunt bracket is set to the lower scale range position.

It will be seen that with the arrangement just described, the zero of the lower scale range is substantially undisturbed while the zero of the upper scale range is shifted to coincide with that of the lower scale range. It will be appreciated that the desired reluctance may be introduced into the magnetic circuit in various other ways such as by means of a single non-magnetic spacer in only one of the surface engageable prongs.

In certain applications, it will be desired only to determine whether the thickness of a particular coating falls within a specified tolerance limit rather than to measure the actual thickness of the coating being inspected. Accordingly, this invention provides adjustable indicating means which can be set to a preselected position so as to identify predetermined limits of deflection of the indicating pointer 43, thereby permitting the gauge to be used as what is commonly referred to as a "go, no-go" gauge.

Referring in particular to Figs. 8 and 9, a pair of indicating pointers 69 and 70 are provided and are adjustable from the exterior of the casing 1 by means of a pair of slotted shafts 71 and 72. The shafts are provided with off set pins 73 and 74 which extend into elongated slots 75 and 76 in a pair of slotted brackets 77 and 78 slidably mounted on the supporting bracket 34. As shown in Fig. 9, the brackets 77 and 78 are provided with arcuately shaped slot portions 79 and 80, each of which engages a pair of guide screws 81 to allow sliding motion of the bracket along an arcuate path.

In order to use the gauge as an inspection device of the type just described, the gauge would first be brought into engagement with a standard coating having a thickness representing a zero tolerance variation. The cover member 44 would then be rotated to adjust the pointer to the null mark in the manner already described. The locking knob 28 is then tightened down drawing up the bushing 25 to cause the snap ring 35 to bind against the bearing 33 thereby locking the cover member 44 and its associated assembly against inadvertent rotation.

The gauge is then brought into contact with a non-magnetic coating having thickness representing the upper tolerance limit and the pointer 70 is adjusted so as to be aligned with the corresponding deflection of the pointer 43. The pointer 69 is adjusted in a similar manner to correspond with the deflection of the pointer 43 when the gauge is brought into engagement with a standard coating representing the minimum allowable thickness.

When the above adjustments have been completed, the instrument is ready for use as a "go, no-go" gauge. If the deflection of the pointer 43 is outside the limits identified by the indicating pointers 69 and 70 for any given coating being inspected, then the thickness of that coating does not fall within the preselected tolerance limits. For instance, with the pointer 43 in the position shown in Fig. 8, the indication is that the thickness of the coating being inspected is greater than the maximum allowable thickness as defined on a deflection basis by the position of the pointer 70. With this arrangement the inspection of non-magnetic coatings can be very rapid since the pointer swings through only a very small arc and does not have the damping problems which would be associated with a large deflection such as would be encountered with gauges of the type heretofore used. Also the total scale area involved is quite small and contains no other indicating markings which might be confusing to the operator so that the reading can be taken quickly and with less probability of error than would be the case with a conventional scale having the usual indicating markings.

In normal operation, where it is desired to measure the actual thicknesses of non-magnetic coatings, the instrument can be zeroed by first loosening the knob 28 and placing the prongs 8 and 9 directly into engagement with the surface of a magnetic material where, of course, a zero reading is desired. The cover 44 is then rotated to bring the pointer 43 into the null position. The knob 47 is then loosened to allow the cover 44 to be rotated without disturbing the null setting of the pointer 43. The cover 44 is then rotated to bring the indicating mark 50 into alignment with the zero mark on the scale 36 and the knob 47 is then tightened so that the position of the pointer can be thereafter adjusted by rotation of the cover 44. When these adjustments have been completed, the instrument is ready for use in a conventional manner to determine actual thickness of non-magnetic coatings in the manner already described.

It can be seen from the foregoing that this invention provides a thickness gauge having greatly increased utility and versatility over devices in this category heretofore used. For instance, the gauge described herein and illustrating one embodiment of this invention, is provided with a useful scale range which is physically expanded far beyond the total available deflection of the magnetic armature, and means are further provided for adjusting the sensitivity of the instrument to correspond with a plurality of scale ranges thus increasing both the readability of the instrument and extending the range of thickness measurements which can be accurately taken. Further, the instrument can be conveniently used either as an inspection device for rapidly inspecting non-magnetic films or coatings on a tolerance variation basis, or as a measuring device for accurately determining the thicknesses of individual coatings if so desired. In addition, this invention eliminates in the manufacture of such instruments the need for relatively large zero suppression adjustments of the deflection opposing spring.

It will be realized that the above description and associated drawings have been made detailed in nature only for the purpose of fully and clearly setting forth a particular embodiment of this invention and it should be apparent that such full and clear disclosure should not be adversely construed as limiting the true scope and spirit of this invention as defined in the appended claims. For instance, the magnetic circuitry of the instrument may be varied from that shown or a soft iron rotor may be used instead of the permanent magnet rotor shown and the rotor may, of course, be mounted in a manner different than the one illustrated. Further it will be obvious that the expanded scale arrangement may be varied in configuration without departing from the scope of this invention such as, for instance, by providing a movable scale instead of a stationary one and by fixing an equivalent of the indicating cover member in a stationary position instead of movably mounting it as in the present embodiment.

Accordingly, it will be apparent that the teachings set forth herein may be employed in various ways and in different applications and that various modifications, substitutions, combinations and changes may be made and employed in the embodiment set forth herein without departing from the true scope of this invention in its broader aspects.

What we claim as new and desire to secure by Letters Patent of the United States is:

1. A magnetic thickness gauge for measuring the thicknesses of layers of nonmagnetic materials on magnetic base materials comprising a magnetic circuit energized by permanent magnet means and including a pair of spaced apart members formed of a magnetic material, surface engageable means at the outer extremities of said members protruding from said gauge for engagement with the surface of a material to be inspected, a rotatably deflectable permanent magnet member between said spaced apart members, spring means opposing deflection of said permanent magnet member, first indicating means responsive to deflection of said permanent magnet member, null indicating means for identifying a preselected null position of said first deflection responsive indicating means, a calibrated scale, second indicating means registrable with said calibrated scale, and means for manually adjusting the magnitude of the said opposing force exerted by said spring including means for causing relative movement between said second indicating means and said calibrated scale, whereby said adjusting means may be manually adjusted to move said first indicating means to said preselected null position with a reading on said calibrated scale being indicated thereby.

2. A magnetic thickness gauge comprising a pair of spaced apart members formed of a magnetic material and each terminating at its outer end in a surface engageable portion protruding from said gauge for engagement with the surface of a material to be inspected, a permanent magnet interconnecting the inner ends of said spaced apart members, a pivotally mounted permanent magnet armature positioned between said spaced apart members and deflectable responsive to the intensity of the magnetic field between said members, and indicating pointer responsive to rotative deflection of said permanent magnet armature, means for indicating a preselected null position of said indicating pointer, spring means exerting a torque opposing rotative deflection of said permanent magnet armature, a scale calibrated in thickness units and physically extending beyond the maximum limits which could normally be accommodated by the full useful deflection of said permanent magnet armature and associated pointer, an indicator registrable with indicia on said extended scale, and means for manually adjusting the torque opposing deflection exerted by said spring including means for simultaneously causing relative movement between said scale and said indicator thereby allowing said pointer to be adjusted to said preselected null position by manual adjustment of said torque adjusting means with a reading on said calibrated scale being thereby registered by said indicator.

3. A magnetic thickness gauge comprising a pair of spaced apart bars of magnetic material extending in substantially parallel relationship with respect to each other, surface engageable means extending from the outer ends of said bars and protruding from said gauge so as to be engageable with the surface of a material to be inspected, a permanent magnet extending between the inner ends of said bars, a rotatably mounted spindle extending into the space between said bars in substantially parallel relationship thereto from the direction of the inner ends thereof, said spindle including a permanent magnet probe positioned between said bars and magnetized transversely to the axis of said spindle, spring means for exerting a torque resiliently restraining angular deflection of said spindle, a pointer deflectable with said spindle and extending transversely to the axis thereof, a scale plate bearing measurement indicia calibrated in thickness units extending over said pointer and substantially perpendicular to the axis of said spindle, an aperture in said scale plate for viewing said pointer, indicating means visible through said aperture and identifying a preselected null position of said pointer, a manually rotatable cover member including a transparent portion extending over the measurement indicia on said scale plate, said cover member including an indicator movable therewith and registrable with the indicia on said scale plate to indicate a reading thereon, and means interconnecting said cover member and said spring means to permit adjustment of the spring torque opposing deflection of said spindle thereby allowing said pointer to be adjusted to said preselected null position by manual movement of said cover member with a reading on said calibrated scale being thereby registered by the indicator movable with said cover member.

4. In a magnetic thickness gauge of the magnetic deflection type having means deflectable against a resilient restraining force in response to the intensity of a magnetic field in an air gap portion of a magnetic circuit, an arrangement for providing a plurality of expanded scales and scale ranges with each of said scales being physically expanded beyond the total available deflection sweep of said deflectable means, said arrangement comprising first indicating means responsive to deflection of said deflectable means, means for identifying a preselected position of said first indicating means, means for manually adjusting the magnitude of said resilient restraining force to permit adjustment of said first indicating means to said preselected position, an expanded scale having a plurality of scale ranges thereon, second indicating means responsive to adjustment of said restraining force for indicating a reading on said expanded scale, and means for selecting different scale ranges on said expanded scale comprising magnetic shunting means manually adjustable to a plurality of different positions to provide different fixed shunting effects on said air gap field and thereby provide different reference levels of intensity of said air gap field.

5. A magnetic thickness gauge comprising a pair of spaced apart bars of magnetic material extending in substantially parallel relationship with respect to each other, surface engageable means extending from the outer ends of said bars and protruding from said gauge so as to be engageable with the surface of a material to be inspected, a permanent magnet extending between the inner ends of said bars, a pivotally mounted permanent magnet armature positioned in the space between said bars and deflectably responsive to the intensity of the magnetic field between said bars, indicating means responsive to deflection of said armature, and a manually movable magnetic shunt adjustable to a first predetermined position closely adjacent the outer ends of said bars to provide a magnetic shunting path therebetween and thereby decrease the reference intensity of the field in the air gap between said bars to provide a first scale range for thickness measurements, said shunt being movable in a direction away from the outer ends of both of said bars and said magnetic armature to a second predetermined position away from said first position to reduce said shunting effect and thereby provide a second scale range for thickness measurements.

6. A magnetic thickness gauge comprising a pair of spaced apart members of magnetic material, surface engageable means extending from the outer ends of said members and protruding from said gauge so as to be engageable with the surface of a material to be inspected, a permanent magnet extending between said members of magnetic material in the vicinity of the inner ends thereof, a pivotally mounted permanent magnet armature positioned in the space between said members and angularly deflectable responsive to the intensity of the magnetic field in said space, first indicating means responsive to deflection of said armature, means for identifying a preselected position of said first indicating means, spring means exerting a resilient restraining torque opposing angular deflection of said armature, means for manually adjusting the magnitude of said resilient restraining force to permit adjustment of said first indicating means to said preselected position, an expanded scale having a plurality of scale ranges thereon extending over an area greater than that which could be swept with the maximum useful deflection of said first indicating means, second indicating means, responsive to adjustment of said restraining force for indicating a reading on said scale, and an adjustable magnetic shunt for setting the sensitivity level of said armature and associated first indicating means to correspond with a desired scale range on said expanded scale, said shunt being manually movable to one position closely adjacent said members of magnetic material to provide a magnetic shunting path therebetween and thereby decrease the reference intensity of the field between said magnetic members to provide a first sensitivity setting corresponding to one of said scale ranges, and said shunt being movable to a second position away from said first position to reduce said shunting effect and thereby provide a second sensitivity setting corresponding to another of said scale ranges.

7. In a magnetic thickness gauge of the type having means deflectable in response to the intensity of a magnetic field, the combination of first indicating means responsive to said deflectable means, means for indicating a predetermined position of said first indicating means, means for exerting a force opposing deflection of said deflectable means including means for adjusting the magnitude of said opposing force thereby allowing adjustment of said first indicating means to said predetermined position, and second indicating means manually adjustable over a range of fixed positions to identify preselected maximum deflections of said first indicating means on either side of said predetermined position, thereby allowing said gauge to be used as an inspection device on a tolerance limit basis.

8. A magnetic thickness gauge for measuring and inspecting thicknesses of layers of non-magnetic materials on magnetic base metals comprising a magnetic circuit energized by permanent magnet means and including a pair of spaced apart members formed of a magnetic material, surface engageable means at the outer extremities of said members protruding from said gauge for engagement with the surface of a material to be inspected, a rotatably deflectable permanent magnet member between said spaced apart members, spring means opposing deflection of said permanent magnet member, null indicating means for identifying a preselected null position of said first deflection responsive indicating means, means for manually adjusting the magnitude of said deflection opposing spring force including means for causing relative movement between said second indicating means and said calibrated scale to indicate a reading thereon, and a pair of indicators positioned one each on opposite sides of said null indicating means and adjustable to identify preselected maximum deflections of said first indicating means on either side of said null indicating means corresponding to predetermined thickness tolerance limits, whereby said gauge may be used either to measure actual thicknesses of non-magnetic coatings or as an inspection device to determine whether the thicknesses of such coatings are within predetermined tolerance limits.

9. An instrument for determining the thickness of a non-magnetic layer or coating on a magnetic base material comprising a magnetic circuit including an air gap portion therein, means for producing a magnetic field in said magnetic circuit and in said air gap, means including surface engageable means for producing a magnetic shunting effect on said gap proportional to the thickness of a non-magnetic coating the thickness of which is to be determined, indicating means deflectable under the influence of the magnetic field in said air gap, and magnetic biasing means producing a field opposing said first mentioned field to the extent that when said surface engageable means are brought directly into contact with a surface of a magnetic material the net intensity of the magnetic field in said air gap becomes substantially zero.

10. A magnetic thickness gauge for measuring the thicknesses of layers of non-magnetic materials on magnetic base materials comprising a magnetic circuit energized by permanent magnet means and including a pair of spaced apart members formed of a magnetic material, surface engageable means at the outer extremities of said members protruding from said gauge for engagement with the surface of a material to be inspected, a rotatably deflectable armature of magnetic material between said spaced apart members, spring means opposing deflection of said permanent magnet armature, and a pair of permanent magnets mounted one each on each of said spaced apart members adjacent said permanent magnet armature, said permanent magnets producing a field opposing the field produced by said first mentioned permanent magnet means to the extent that when said surface engageable means are brought directly into contact with the surface of a magnetic material, the net intensity of the magnetic field in the vicinity of said permanent magnet armature is reduced substantially to zero.

11. An indicating instrument for determining the thicknesses of non-magnetic layers or coatings on magnetic base materials comprising a magnetic circuit including an air gap therein, means for producing a magnetic field of a predetermined reference intensity in said magnetic circuit and in said air gap, surface engageable means engageable with the surface of a material to be inspected for producing a magnetic shunting effect on said air gap to change the intensity of the field therein as a function of the thickness of the non-magnetic layer being inspected, indicating means deflectable in response to the intensity of the field in said air gap, magnetic shunting means manually adjustable to a plurality of different settings to provide different fixed amounts of shunting around said air gap and thereby allow adjustment of the reference intensity of said air gap to different levels for changing the sensitivity of said instrument, and magnetic biasing means producing a field opposing said first mentioned field to the extent that when said shunting means is in one of said settings establishing a field strength in said air gap of predetermined intensity, the net intensity of the magnetic field in said air gap is reduced to substantially zero when said surface engageable means is brought directly into contact with the surface of a magnetic material.

12. A magnetic thickness gauge comprising a magnetic circuit including an air gap therein, permanent magnet means for producing a magnetic field in said magnetic circuit and in said air gap, surface engageable means engageable with the surface of a material to be inspected for producing a magnetic shunting effect on said air gap to change the intensity of the field therein as a function of the thickness of the non-magnetic layer to be inspected, first indicating means deflectable in response to the intensity of said field, means for identifying a preselected position of said first indicating means, means for exerting a force resiliently opposing deflection of said first indicating means including means manually adjustable to vary the magnitude of said deflection opposing force and thereby permit adjustment of said first indicating means to said preselected position, a scale bearing measurement indicia thereon, means responsive to adjustment of said force adjusting means for identifying a reading on said scale, second indicating means manually adjustable over a range of fixed positions to identify preselected deflection limits of said first indicating means on either side of said preselected position, magnetic shunting means manually adjustable to a plurality of different settings to provide different fixed amounts of shunting around said air gap and thereby allow adjustment of the reference intensity of said air gap field to different levels, and magnetic biasing means producing a field in said air gap opposing said first mentioned field to the extent that when said surface engageable means are brought directly into contact with the surface of a magnetic material, the net intensity of the magnetic field in said air gap becomes substantially zero.

13. A dual range magnetic thickness gauge comprising a magnetic circuit including an air gap therein, means for producing a magnetic field in said magnetic circuit and in said air gap, surface engageable means engageable with the surface of a material to be inspected for producing a magnetic shunting effect on said air gap to change the intensity of the field therein as a function of the thickness of the non-magnetic layer being inspected, indicating means deflectable in response to the intensity of the field in said air gap, magnetic shunting means manually adjustable to a first fixed position to provide a shunting effect around said air gap and thereby establish an intensity level of the magnetic field in said air gap corresponding to a high range of available thickness measurements, said magnetic shunting means being manually adjustable to a second position to provide a reduced shunting effect around said air gap and thereby establish a higher intensity magnetic field in said air gap corresponding to a low range of available thickness measurements, means for introducing into said magnetic circuit upon movement of said shunting means to said high range setting and in series with said surface engageable means a magnetic reluctance substantially equivalent to the reluctance introduced into said circuit by engagement of said surface engageable means with a non-magnetic layer having a thickness which would otherwise produce a reading on said high range setting equivalent to a zero reading on said low range setting, and means for removing said reluctance from said circuit upon adjustment of said shunting means to said low range setting.

References Cited in the file of this patent

UNITED STATES PATENTS

| 497,448 | Hoyt | May 16, 1893 |
| 1,626,005 | Malmberg et al. | Apr. 26, 1927 |
| 2,102,409 | Faus | Dec. 14, 1937 |
| 2,318,720 | Sewell | May 11, 1943 |
| 2,384,529 | Breitenstein | Sept. 11, 1945 |
| 2,469,476 | Sellars | May 10, 1949 |
| 2,588,143 | Mendelsohn | Mar. 4, 1952 |

FOREIGN PATENTS

| 378,983 | Great Britain | Aug. 25, 1932 |